No. 793,135. PATENTED JUNE 27, 1905.
R. M. KELLOGG.
APPARATUS FOR REPAIRING LEAKS.
APPLICATION FILED JULY 13, 1901.

Witnesses
Charles W. Hildreth
Bert C. Jnee.

Inventor
Robert M. Kellogg.
By his Attorney
Alexander C. Proudfit

No. 793,135. Patented June 27, 1905.

UNITED STATES PATENT OFFICE.

ROBERT M. KELLOGG, OF METUCHEN, NEW JERSEY.

APPARATUS FOR REPAIRING LEAKS.

SPECIFICATION forming part of Letters Patent No. 793,135, dated June 27, 1905.

Application filed July 13, 1901. Serial No. 68,164.

*To all whom it may concern:*

Be it known that I, ROBERT M. KELLOGG, of Metuchen, New Jersey, have invented certain Improvements in Apparatus for Repairing Leaks, of which the following description, in connection with the accompanying drawings, is a specification, like numerals on the drawings designating like parts.

This invention relates to means for the repair of ruptured pipes, and contemplates particularly means for reducing the bursting tendency in ruptured pipes forming part of systems for the distribution of water, although it will be understood that I contemplate the utilization of my improvements in any field for which their nature renders them fit.

Repair-sleeves have been at times applied to ruptured water-pipes when the break occurred at a portion of the pipe intermediate two joints, it being the usual practice to make some attempts to heal the break by stuffing the crack or interposing a layer of packing material or cement between the pipe and sleeve; but such an expedient is expensive and at best temporary, the crack being liable to enlargement and the packing to deterioration, toward which the water of leakage is a contributory factor. When the break occurs at or near a joint, the ruptured portion is usually cut out and a substitute part inserted, necessitating delay, fire and other risks, and annoyances from the interruption of the flow of water and a relatively high expense.

The object of my invention is to render possible the application of the repair-sleeve to breaks near joints and to increase its efficiency wherever applied, my improvements, in contradistinction to those above noted, contemplating the utilization of the water of leakage to set up a balance of pressure on the two sides of the ruptured pipe-wall and yield exterior support thereto. The manner in which this may be accomplished advantageously and convenient means by which it may be carried into practice, with the various features of my invention, will be illustrated and described fully in the accompanying drawings and specification, and pointed out in the claims.

The method herein disclosed for reducing the bursting tendency in ruptured pipes forms the subject-matter of a separate divisional application, Serial No. 245,901, filed February 16, 1905.

Figure 1:
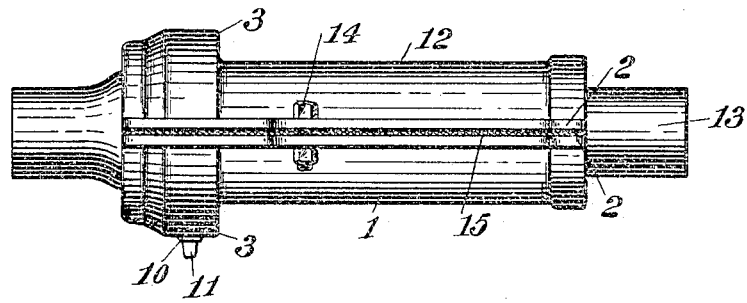
Figure 2:
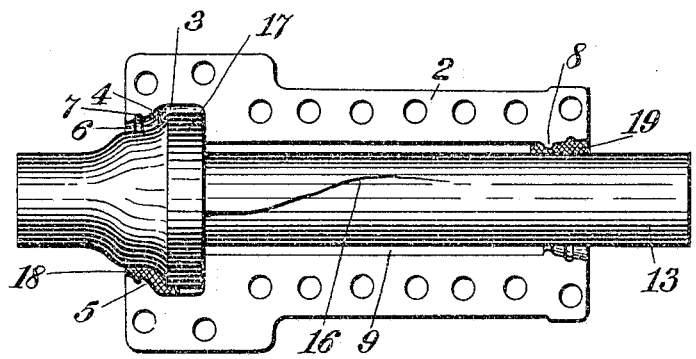

In the drawings, Figure 1 is a view in side elevation of a repair-sleeve in place in accordance with my invention upon a pipe, the latter being shown in elevation, while Fig. 2 is a plan view of one of the coöperating members of the sleeve with the pipe in place.

In accordance with my invention the ruptured portion of the pipe is surrounded with a repair-sleeve provided with a vent to permit escape of the water of leakage. The sleeve is sealed on each side of the ruptured portion while the vent is still open, and the vent is then closed, so that the water of leakage escaping thereafter into the sleeve is retained, sets up a balance of pressure with reference to the ruptured walls, and yields an elastic support exteriorly to the walls of the ruptured pipe.

Preferably the sealing of the sleeve is accomplished in such a manner that air will be included in the sleeve and coöperate with the water of leakage to set up the countervailing support to the walls of the pipe and also serve as an elastic cushion against waterhammer and like shocks or changes of pressure, and this may be accomplished conveniently by locating the vent at a low portion of the sleeve, so that the accumulation of water of leakage above the vent will seal it against escape of inclosed air.

In the form of construction selected for illustration and description as a convenient embodiment to enable the ready and clear comprehension of my improvements and the manner by which they may be put into practice the part designated by the reference-numeral 1 is a sleeve member, shown as semicylindrical, flanged laterally at 2, having a swell or enlargement 3 near one end, adjacent which, as at 4, the throat 5 is illustrated as tapering toward the mouth 6 and provided with a groove 7, while near the other end a ridge 8 projects inwardly from the generally cylindrical surface 9, and at 10 an aperture or vent is illustrated provided with a plug or closure 11. A similar sleeve member 12 may be utilized, when the sleeve takes the form illustrated, to complete the inclosure of the pipe 13, and the member may be joined by suitable means 14, as the bolts shown under that designation, preferably with a packing 15, of asbestos or like non-deteriorating material, interposed, while the conformation of the throat 5 and ridge 8 will lend themselves readily to the sealing of the sleeve on each side of the rupture (indicated at 16) near the pipe-joint 17, a convenient material for such seals being lead tamped in, as illustrated at 18 and 19.

It is to be understood that while I regard cast-iron as a suitable material from which to form the sleeve members, especially when a large water-main is to be repaired, and while the contour of sleeve members illustrated and the use of two members to form the sleeve is probably the most convenient in the application of my improvement to the kind of rupture depicted nevertheless I do not limit myself to the materials nor exact forms of construction described and illustrated nor to the application of my improvements near a pipe-joint, nor in general otherwise than as pointed out in the claims read in connection with this specification.

Having thus fully illustrated and described my invention, what I claim, and that on which I wish to secure protection, is—

A non-bursting joint for ruptured water-pipes consisting of a water-tight sleeve to surround the ruptured region and contain water of leakage acting as a countervailing support to the walls of said pipe and as an elastic cushion against water-hammer and like shocks, said sleeve having an inferiorly-situated vent to permit said water of leakage to be withdrawn during the completion of said joint.

In testimony whereof I have signed my name to this specification in the presence of two subscribing witnesses.

ROBT. M. KELLOGG.

Witnesses:
    GROVER C. LEHLEIN,
    CHARLES H. MOSS.